UNITED STATES PATENT OFFICE.

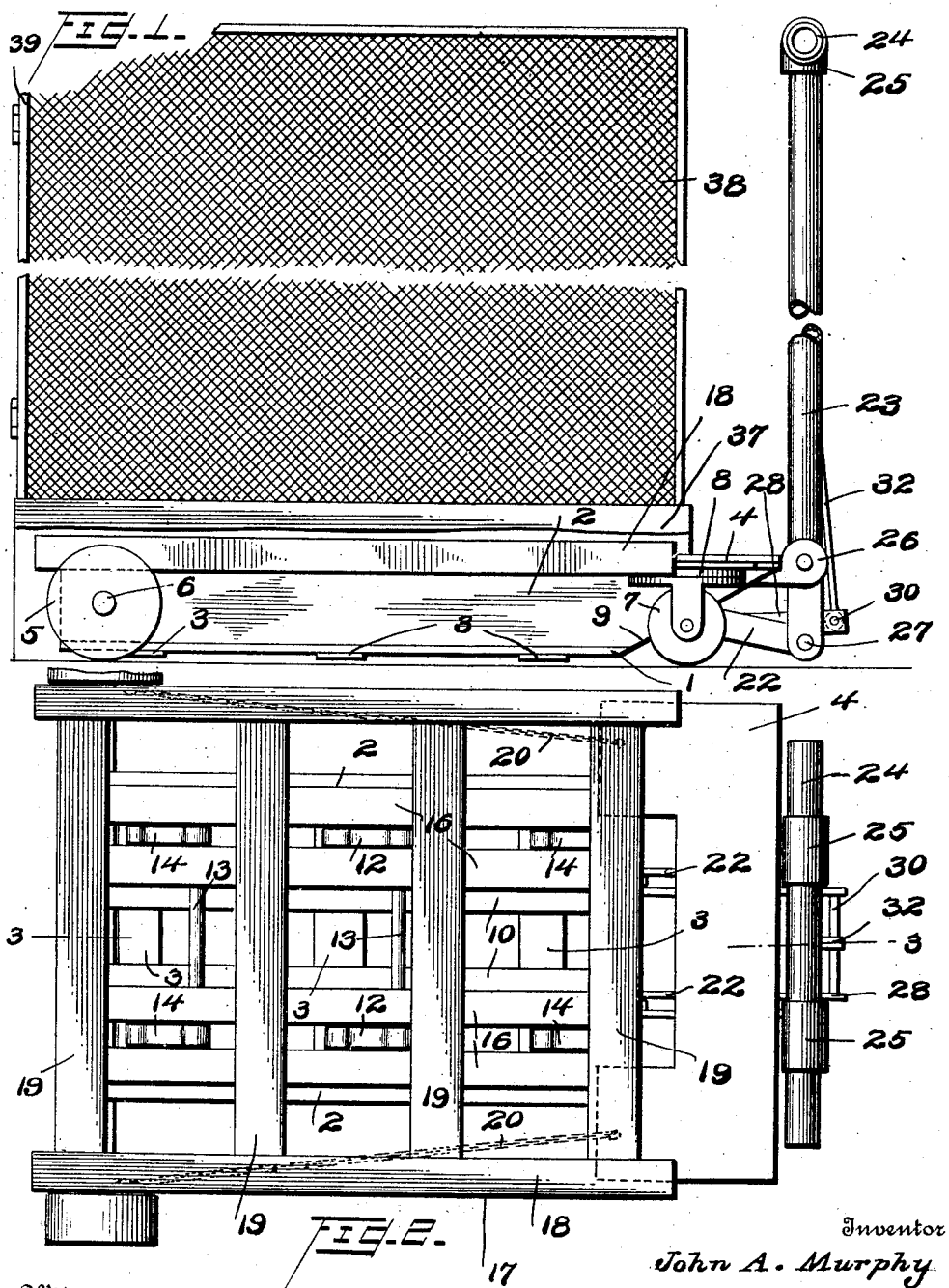

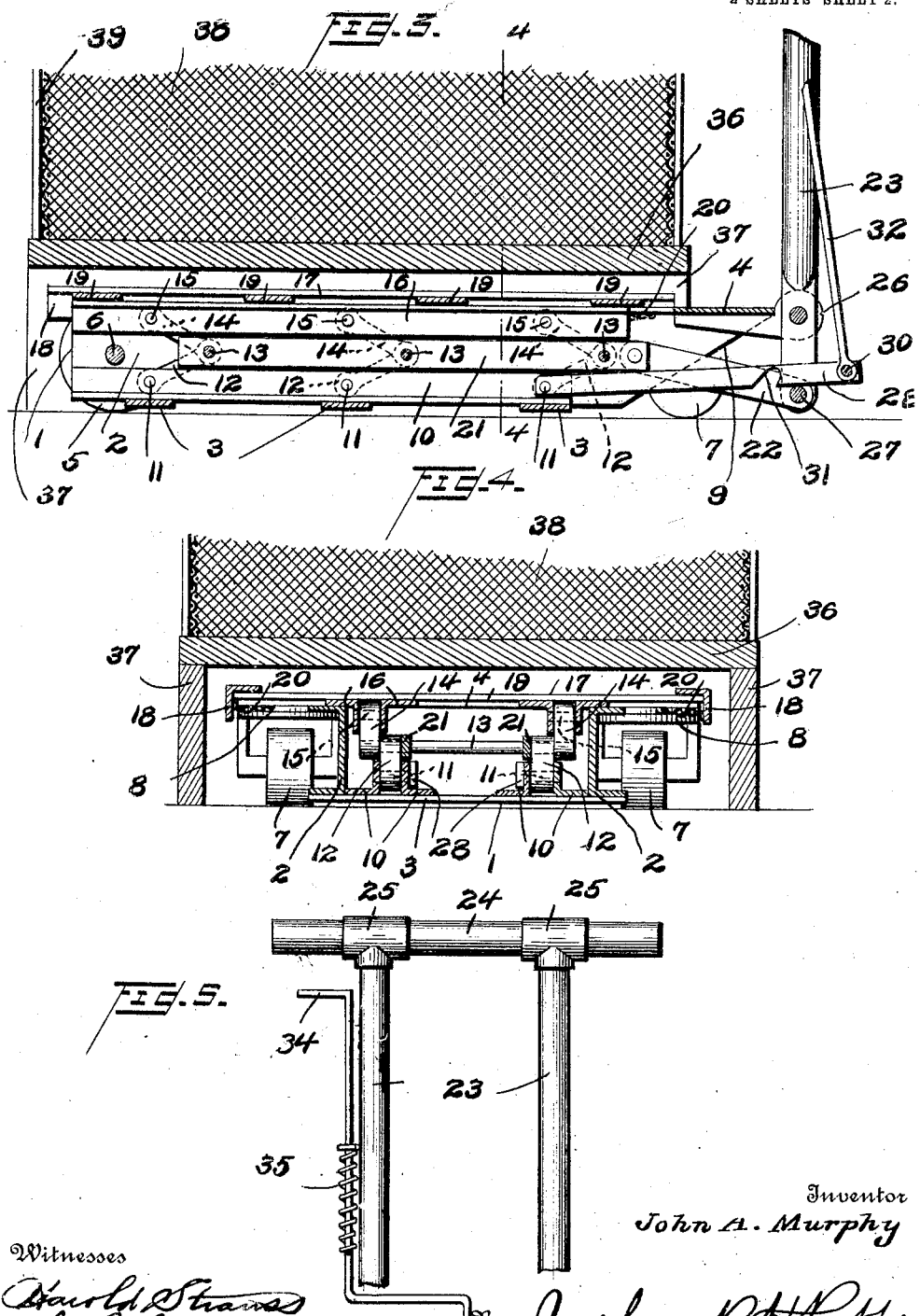

JOHN A. MURPHY, OF PHILADELPHIA, PENNSYLVANIA.

ELEVATING-TRUCK.

1,114,282. Specification of Letters Patent. Patented Oct. 20, 1914.

Application filed November 22, 1913. Serial No. 802,341.

*To all whom it may concern:*

Be it known that I, JOHN A. MURPHY, a citizen of the United States, residing at Philadelphia, in the county of Philadelphia and State of Pennsylvania, have invented certain new and useful Improvements in Elevating-Trucks, of which the following is a specification.

My invention relates to improvements in elevating trucks, the object of the invention being to provide an improved truck which is adapted to run under a loaded platform, elevate the platform and transport the same to any convenient point, facilitating the transportation of goods of various character.

A further object is to provide improved means for elevating and locking in elevated position, the load supporting table of the truck.

A further object is to provide a truck of this character with an improved arrangement of handle by means of which latter the truck may be operated either to raise or lower or to be moved about, and provide in a convenient position on the handle, an improved means for releasing the elevating table from its locked upper position.

With these and other objects in view, the invention consists in certain novel features of construction and combinations and arrangements of parts as will be more fully hereinafter described and pointed out in the claims.

In the accompanying drawings Figure 1 is a view in side elevation partly broken away illustrating my improvements. Fig. 2 is a plan view of the truck. Fig. 3 is a view in longitudinal section on the line 3—3 of Fig. 2 but showing a fragment of the platform and cage with which my improved truck is particularly designed for use. Fig. 4 is a view in section on the line 4—4 of Fig. 3, and Fig. 5 is a view in elevation illustrating the handle and the lock operating device.

My improved truck comprises a frame 1 composed of longitudinal channel bars 2, connected at their lower flanges by transverse bars 3, and at their upper flanges by a plate 4. The forward ends of the channels 2 are beveled as shown at 9, so that they extend forwardly at their upper edges beyond their lower edges, so that the plate 4 is positioned at the extreme end of the frame 1 for a purpose which will hereinafter appear.

At one end of the truck, wheels 5 are mounted to turn on an axle 6 and adjacent the other end of the truck, caster wheels 7 are located. These caster wheels 7 have ball bearings 8 below the plate 4, so that they may turn freely in any direction and allow the truck to be readily guided during its movement.

On the transverse bars 3, I secure two pairs of angle irons 10 which have pivot pins 11 projected therethrough. These pins 11 extend through the perforated ends of links 12, the latter connected by transverse rods 13. The rods 13 also project through the perforated ends of links 14, and the latter at their upper ends are pivotally connected by pins 15 with angle irons 16 secured to the under face of an elevating table 17.

The links 12 and 14 with their pivots, constitute toggle levers, and while I am not limited to any particular number of such toggle levers, I have illustrated three pairs of such levers which I find a convenient number.

The elevating table 17 is composed of longitudinal side angles 18 and transverse bars 19, and the side angles 18 are connected by chains 20 with plate 4, so that the longitudinal movement of the table 17 is limited by the chains, the latter compelling the table to move upwardly when the toggle levers are operated as will now be explained.

The rods 13 of all of the toggle levers are connected by bars 21 which have openings to receive the rods, and at their forward ends are connected by links 22 with the shorter ends of a handle 23. The handle 23 is preferably composed of parallel pipes with the hand gripping member 24 connected thereto by T-couplings 25, although this handle may be made in various other ways.

The handle is pivotally connected near its end to brackets 26 which are secured to the under face of plate 4, and project forwardly beyond the same. A pivot pin 27 constitutes the pivotal connection between the links 22, and the two parallel pipes of the handle, and over this pin 27, a pivoted locking frame 28 is positioned. This frame 28 consists of parallel bars pivotally connected at their inner ends by two of the pins 11 to angle bars 10, and at their outer ends connected by a transverse pin 30.

Notches 31 are provided in the side bars of frame 28, so that when the parts are operated to elevate the table, the notches will receive pin 27 and hold the parts against accidental movement. To release this locking frame, I provide a rod 32 which is connected to the pin 30 and extends up beside the handle 23. At the free end of the rod 32, a hand hold 34 is formed adjacent the gripping member 24 of the handle, so that without removing the hands from the handle, this locking frame may be operated to release. A coiled spring 35 is provided around the rod 32 and normally exerts a pressure on the rod and the locking frame to hold the latter in operative position.

My improvements are especially adapted for use in connection with a platform such as indicated at 36. This platform 36 may contain any character of merchandise, packages, and the like, and it will be observed that the said platform is provided with side plates 37 which support the platform above the floor a distance sufficient to allow the truck to be moved under the same when the table 17 is in its lowered position.

On top of the platform 36, a cage 38 is preferably located to allow a relatively large amount of merchandise to be packed on the platform. For convenience of operation, one section of this cage as indicated at 39 may be made hinged or otherwise movable. This facilitates the loading of the platform and the cage prevents loss of the merchandise by fraud or accident.

In operation, after the platform is loaded, the truck will be run under the platform as shown clearly in Figs. 1, 3, and 4. When in this position, the handle 23 is swung downwardly so that the lower shorter end of the handle will move the links 22 longitudinally, thereby imparting a longitudinal movement to the bars 21 and consequently moving the rods 13 in their rearward direction. This movement of the rods compels the toggle levers to expand, causing the table 17 to elevate and lift the platform 36. The chains 20 compel the table to move vertically instead of longitudinally, and the flexibility of such chains facilitates the movement without binding the toggle joints. When the table is elevated, the handle will be moved to such a position that the locking frame 28 will fall into locked position with the pin 27 in the notches 31, and by reason of the angle of the walls of these notches, the pin will be securely held, so that the truck may be readily manipulated with its platform thereon so as to convey the latter to any desired place. The caster wheels 7 facilitate the movement of the truck, allowing the same to be turned in its own length and hence the platform may be readily carried and moved about at will. When it is desired to lower the platform, the operator grasps the hand hold 34, exerting a pull on rod 30 and elevating the locking frame 28, when by slowly moving the handle, the table 17 can be lowered and with it the platform, and when the platform is in its lowered position, the truck can be run out from under the same and be used again in like manner. By providing a relatively long handle, a great leverage may be had, so that heavy loads may be conveniently handled with but slight exertion on the part of the operator.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An elevating truck, comprising a frame consisting of parallel side bars connected by transverse bars, a plate secured on top of the side bars at their forward ends, wheels supported in the rear ends of the side bars, caster wheels supported below the said plate, a table above the frame, flexible devices connecting the table and the plate, toggle levers connecting the table and the frame, and means for operating the toggle levers to raise and lower the table relative to the frame, substantially as described.

2. An elevating truck, comprising a frame consisting of parallel side bars connected by transverse bars, a plate secured on top of the side bars at their forward ends, wheels supported in the rear ends of the side bars, caster wheels supported below the said plate, a table above the frame, flexible devices connecting the table and the plate, toggle levers connecting the table and the frame, transverse rods constituting the pivots of the toggle-levers, bars connecting all of the rods, and means for moving the bars longitudinally to operate the toggle levers and raise and lower the table, substantially as described.

3. An elevating truck, comprising a frame consisting of parallel side bars connected by transverse bars, a plate secured on top of the side bars at their forward ends, wheels supported in the rear ends of the side bars, caster wheels supported below the said plate, a table above the frame, flexible devices connecting the table and the plate, toggle levers connecting the table and the frame, transverse rods constituting the pivots of the toggle levers, bars connecting all of the rods, means for moving the bars longitudinally to operate the toggle levers and raise and lower the table, a lever pivotally supported between its ends on the plate, links connecting the lower ends of the lever with the last-mentioned bars, and a pivoted locking frame connected to the frame and adapted to lock the lever when the latter is moved to a position to elevate the table, substantially as described.

4. An elevating truck, comprising a frame consisting of parallel side bars connected by transverse bars, a plate secured on top of the side bars at their forward ends, wheels supported in the rear ends of the side bars, caster wheels supported below the said plate, a table above the frame, flexible devices connecting the table and the plate, toggle levers connecting the table and the frame, transverse rods constituting the pivots of the toggle levers, bars connecting all of the rods, means for moving the bars longitudinally to operate the toggle levers and raise and lower the table, a lever pivotally supported between its ends on the plate, links connecting the lower ends of the lever with the last-mentioned bars, a pivoted locking frame connected to the frame and adapted to lock the lever when the latter is moved to a position to elevate the table, a spring-pressed rod supported on the handle and connected to said locking frame, said rod having a hand hold thereon at its free end, substantially as described.

In testimony whereof I have signed my name to this specification in the presence of two subscribing witnesses.

JOHN A. MURPHY.

Witnesses:
 C. R. ZIEGLER,
 S. W. FOSTER.